(12) United States Patent
Park et al.

(10) Patent No.: US 9,106,758 B2
(45) Date of Patent: Aug. 11, 2015

(54) APPARATUS AND METHOD FOR SEARCHING LOCATION RELATED CONTENTS IN PORTABLE TERMINAL

(75) Inventors: Se-Won Park, Seoul (KR); Cheol-Ho Cheong, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 193 days.

(21) Appl. No.: 13/361,725

(22) Filed: Jan. 30, 2012

(65) Prior Publication Data

US 2012/0270503 A1 Oct. 25, 2012

(30) Foreign Application Priority Data

Apr. 25, 2011 (KR) .......................... 10-2011-0038215

(51) Int. Cl.
*H04B 7/00* (2006.01)
*H04M 1/725* (2006.01)

(52) U.S. Cl.
CPC ........ *H04M 1/7253* (2013.01); *H04M 1/72572* (2013.01); *H04M 2250/02* (2013.01); *H04M 2250/04* (2013.01)

(58) Field of Classification Search
CPC ...................... H04M 1/7253; H04M 1/274508
USPC ........................................ 455/41.2, 41.3, 41.1
See application file for complete search history.

(56) References Cited

U.S. PATENT DOCUMENTS

| | | | | |
|---|---|---|---|---|
| 7,606,599 | B2 * | 10/2009 | Wakasa et al. | 455/566 |
| 8,165,524 | B2 * | 4/2012 | Suzuki | 455/41.2 |
| 8,531,704 | B2 * | 9/2013 | Maruyama et al. | 358/1.15 |
| 8,606,293 | B2 * | 12/2013 | Kim et al. | 455/456.1 |

FOREIGN PATENT DOCUMENTS

KR 10-2008-0053027 6/2008

* cited by examiner

*Primary Examiner* — Eugene Yun

(57) ABSTRACT

A method and apparatus search for a place involving contents stored to a portable terminal. Operations of the portable terminal include receiving contents comprising a device address for short range communication; storing the device address; and searching for a short range communication device which uses the device address.

18 Claims, 3 Drawing Sheets

APPARATUS AND METHOD FOR SEARCHING LOCATION RELATED CONTENTS IN PORTABLE TERMINAL

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Apr. 25, 2011 and assigned Serial No. 10-2011-0038215, the entire disclosure of which is hereby incorporated by reference.

TECHNICAL FIELD OF THE INVENTION

The present invention relates generally to a portable terminal. More particularly, the present invention relates to an apparatus and a method for searching for a place relating to contents stored to the portable terminal.

BACKGROUND OF THE INVENTION

Supply of portable terminals such as mobile phones, smart phones, and tablet Personal Computers (PCs) is rapidly growing owing to their convenience and necessity, and now the portable terminal becomes an effective necessity in modern life. Further, service providers and portable terminal manufacturers are providing many additional functions to raise utilization of the portable terminal.

A mobile phone and a mobile communication system are also used as advertizing media. For example, providers such as product manufacturers, sellers, and service providers create a discount coupon or an event advertisement as contents such as message and image and provide users with the contents via the mobile communication system. Hence, the users can download the corresponding contents to their portable terminal and use the downloaded contents in a relevant store. Typically, since the users always carry the portable terminal, the utilization of the coupons can be increased by storing the contents such as coupon to the portable terminal.

However, even if the contents such as coupon are stored to the portable terminal, when the user cannot remember the contents at the place such as content related store, the user cannot use the contents. It is quite hard for the user to remember all of the contents stored to his/her portable terminal. Naturally, even with the contents such as coupon, the user may not use the contents in a timely manner. In this regard, what is a needed is a method for raising the utilization of the stored contents by informing of a place involving the contents stored to the portable terminal.

SUMMARY OF THE INVENTION

To address the above-discussed deficiencies of the prior art, it is a primary aspect of the present disclosure to provide an apparatus and a method for searching for a place involving contents stored to a portable terminal.

Another aspect of the present disclosure is to provide an apparatus and a method for searching for a place involving contents stored by applying a short range communication technology in a portable terminal.

Yet another aspect of the present disclosure is to provide an apparatus and a method for searching for a place involving contents stored using a device address for short range communication of the contents in the portable terminal.

According to one aspect of the present disclosure, a method for operating a portable terminal includes receiving contents including a device address for short range communication; storing the device address; and searching for a short range communication device which uses the device address.

According to another aspect of the present disclosure, an apparatus of a portable terminal includes a first communication module for receiving contents including a device address for short range communication; a storage unit for storing the device address; a second communication module for providing an interface for the short range communication; and a controller for searching for a short range communication device which uses the device address, through the second communication module.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
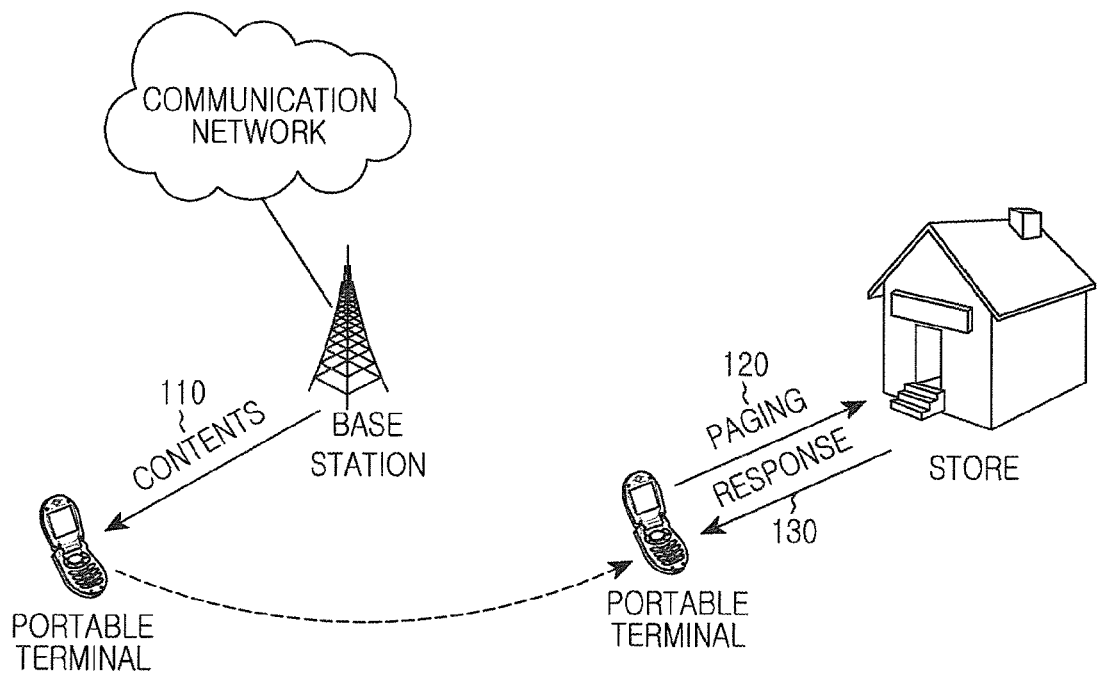
FIG. 1 illustrates a method for searching for a content related place according to an exemplary embodiment of the present disclosure.
Figure 2:
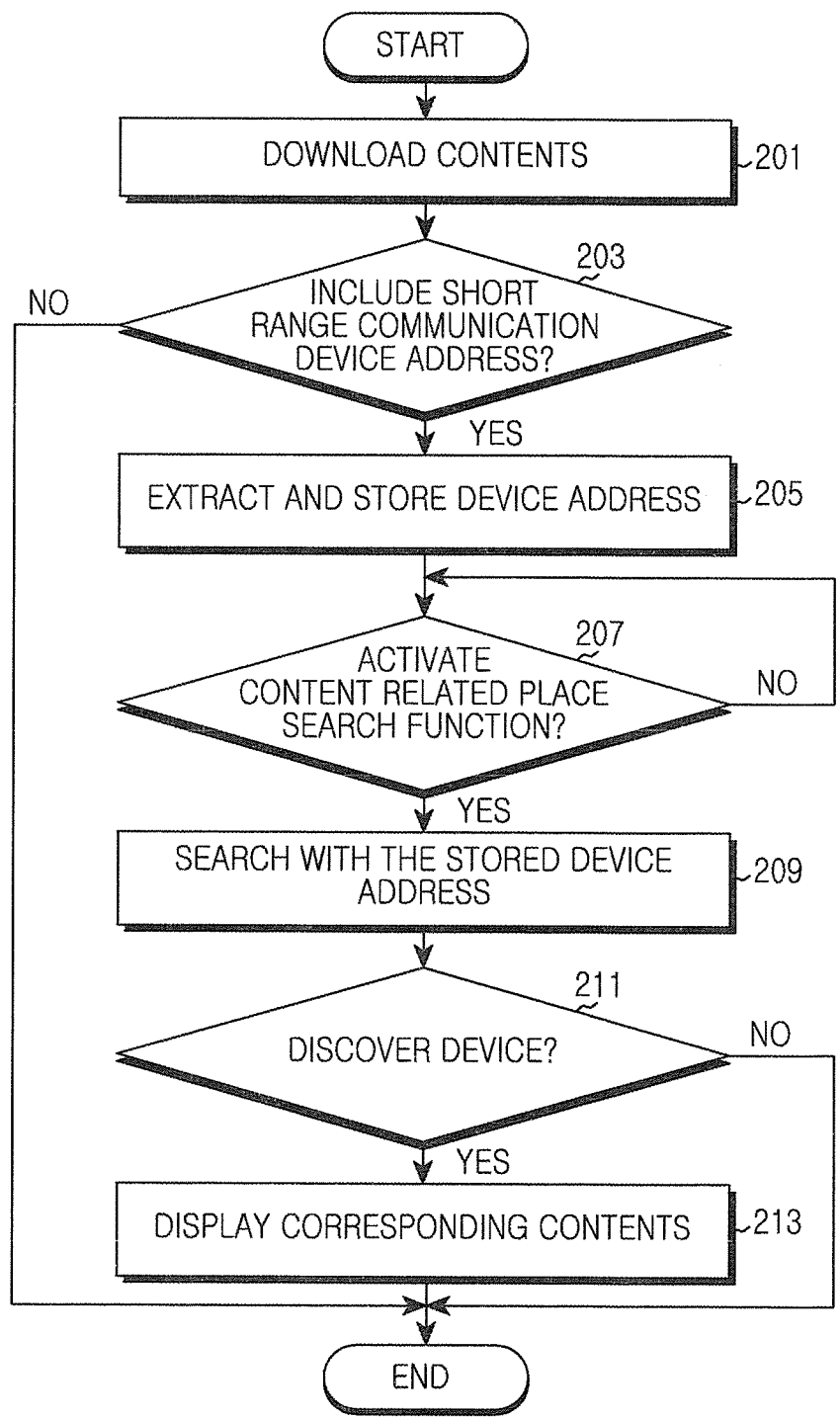
FIG. 2 illustrates operations of a portable terminal according to an exemplary embodiment of the present disclosure.
Figure 3:
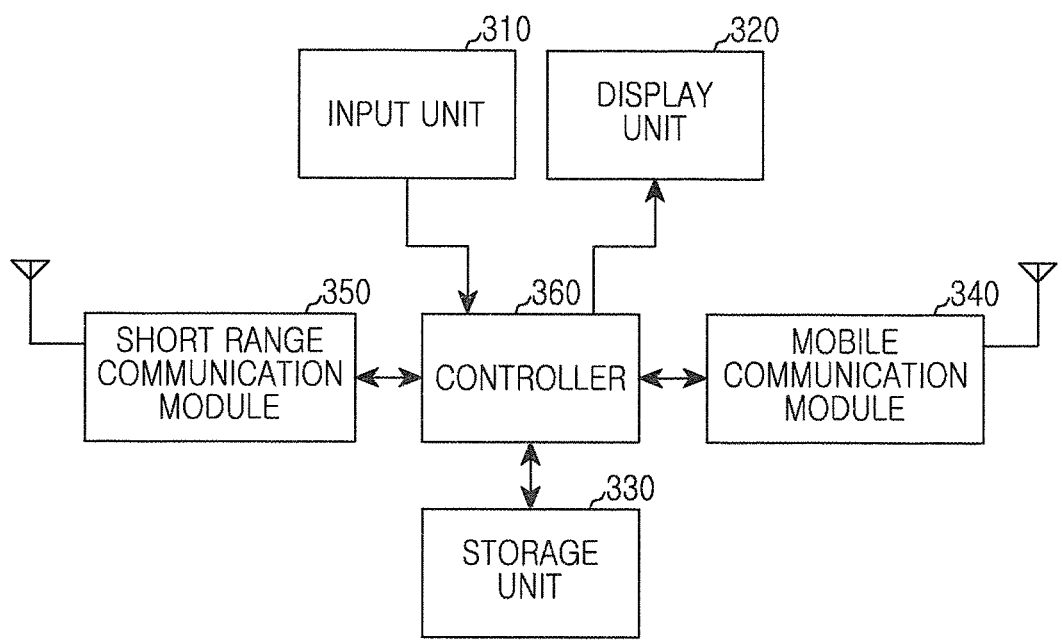
FIG. 3 illustrates a block diagram of the portable terminal according to an exemplary embodiment of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal.

Exemplary embodiments of the present disclosure provide a technique for searching for a place involving contents stored to a portable terminal. Hereinafter, the portable terminal embraces a cellular phone, a Personal Communication System (PCS), a Personal Digital Assistant (PDA), an International Mobile Telecommunication (IMT)-2000 terminal, a smart phone, and the like.

To search for the place involving the contents stored to the portable terminal, a short range communication technology is used. The short range communication technology can employ Near Field Communication (NFC), Bluetooth, Zigbee, and the like. Hereafter, the Bluetooth is exemplified in exemplary embodiments of the present disclosure.

FIG. 1 illustrates a method for searching for a content related place according to an exemplary embodiment of the present disclosure.

Referring to FIG. 1, a portable terminal downloads contents 110 over a communication network. For example, the contents 110 can be downloaded in a message, an e-mail, a Social Network Service (SNS) message, and a web page. The contents 110 can include a discount coupon available in a particular store, event guide, advertisement, explanations of a particular place, and so on.

According to an exemplary embodiment of the present disclosure, the contents 110 include a Bluetooth device address. The portable terminal extracts the Bluetooth device address from the contents 110 and databases identification information of the contents 110 and the Bluetooth address information. For example, the identification information can include an index assigned to the contents 110, a storage location of the contents 110, and the like.

In FIG. 1, it is assumed that the contents 110 include a discount coupon of a particular store. The store is equipped with a Bluetooth communication device, and a device address of the of the Bluetooth communication device is the same as the Bluetooth device address of the contents 110. Accordingly, upon discovering the device of the Bluetooth device address matching the Bluetooth device address of the contents 110, the portable terminal determines presence of the place involving the contents 110 in vicinity and informs the user of the determination.

According to a general Bluetooth device search process, the portable terminal obtains the Bluetooth device address through inquiry and obtains a name and a profile through paging. Herein, since the portable terminal already obtained the Bluetooth device address from the contents 110, the portable terminal transmits a paging signal 120 without the inquiry. When a response 130 for the paging using the Bluetooth device address of the contents 110 is received, this implies the existence of the place involving the contents 110 in the range of the Bluetooth communication.

When the store transmits an advertisement message or inserts contents its web page, the Bluetooth device address of the corresponding store is transmitted or inserted together. The portable terminal downloading the contents extracts and databases the Bluetooth device address of the contents in advance. When the user activates a search function to check usable advertisement and/or coupon information for a particular place, the portable terminal searches its surrounding area using the databased Bluetooth device address. When discovering the matching Bluetooth device, the portable terminal informs the user of the contents corresponding to the Bluetooth device address through the identification information (e.g., index) stored to the database.

Still referring to FIG. 1, the portable terminal searches for the device of the same Bluetooth device address by paging with the stored Bluetooth device address. Alternatively, the portable terminal can search for the device of the same Bluetooth device address through the inquiry. In this example, the portable terminal transmits an inquiry request signal, obtains Bluetooth device addresses of the nearby Bluetooth devices based on a received inquiry response signal, and determines whether the obtained addresses include the stored Bluetooth device address.

In the following, operations and structure of the portable terminal for searching for the place involving the contents as stated above are explained in detail by referring to the drawings.

FIG. 2 illustrates operations of the portable terminal according to an exemplary embodiment of the present disclosure.

Referring to FIG. 2, in step 201, the portable terminal downloads the contents. For example, the contents can include at least one of contents downloaded from a message, an e-mail, a SNS message, and a web page. The contents can include a discount coupon available in a particular store, event guide, advertisement, explanations of a particular place, and so on.

In step 203, the portable terminal determines whether the contents include the device address for the short range communication. Herein, the device address can be contained in various fashions. For example, the device address can be contained as part of the contents, or as metadata such as tag of the contents. When the device address is not contained, the portable terminal finishes this process.

When the device address is contained, the portable terminal extracts and stores the device address in step 205. More specifically, the portable terminal assigns the identification information for the contents and stores the identification information and the device address. For example, the identification information can include at least one of the index and the storage location of the contents. Based on the contents, the portable terminal can classify the device address. For example, the portable terminal can classify the contents based on the business category or the purpose of the contents. The business category or the purpose can be identified using the metadata of the contents, by recognizing a particular keyword in the contents, or according to user's designation.

In step 207, the portable terminal determines whether the content related place search function is activated. That is, the portable terminal determines whether the user's manipulation generates a command corresponding to the content related place search function.

When the content related place search function is activated, the portable terminal searches the surrounding area with the stored device address in step 209. In detail, the portable terminal searches for the short range communication device of the stored device address using a procedure defined in a corresponding short range communication standard. According to an exemplary embodiment of the present disclosure, the portable terminal transmits a signal requesting particular information to the short range communication device of the device address stored in the step 205, and checks whether a response is received. Alternatively, the portable terminal transmits a signal requesting the device address of the nearby short range communication device, and compares at least one device address obtained, with the device address stored in the step 205.

In step 211, the portable terminal determines whether the short range communication device of the stored device address is discovered. In more detail, the portable terminal transmits the signal requesting particular information to the short range communication device of the stored device address and checks whether a response is received. Alternatively, the portable terminal transmits the signal requesting the device address of the nearby short range communication device and determines whether at least one of the obtained device addresses is the same as the stored device address.

When discovering the short range communication device having the stored device address, the portable terminal displays contents corresponding to the stored device address in step 213. At this time, the portable terminal can inform of the content related place in the vicinity and inquire about whether to display the contents. When the user selects not to display the contents, the portable terminal does not display the contents.

FIG. 3 illustrates a block diagram of the portable terminal according to an exemplary embodiment of the present disclosure.

As shown in FIG. 3, the portable terminal includes an input unit 310, a display unit 320, a storage unit 330, a mobile communication module 340, a short range communication module 350, and a controller 360.

The input unit 310 recognizes the input from the user and provides information corresponding to the input to the controller 360. That is, the input unit 310 processes the input of the user through a keypad, a touch screen, a touch pad, and a special function button.

The display unit 320 displays status information generating during the operation of the portable terminal, numbers, characters and images according to execution of an application program. That is, the display unit 320 displays image data provided from the controller 360 in a visual screen. For example, the display unit 320 can employ a Liquid Crystal Display (LCD), an Organic Light-Emitting Diode (OLED), and the like.

The storage unit 330 contains a basic program for the operation of the portable terminal, an application program, and data such as user contents. In particular, the storage unit 330 stores the device address for the short range communication in the downloaded contents. The storage unit 330 provides the stored data according to a request of the controller 360.

The mobile communication module 340 provides an interface for transmitting and receiving signals to and from a base station of the mobile communication network over a radio channel. In detail, the mobile communication module 340 converts transmit data to a Radio Frequency (RF) signal, transmits the RF signal over an antenna, and converts an RF signal received via the antenna to receive data. In so doing, the mobile communication module 340 performs the conversion between the data and the RF signal according to a communication system standard.

The short range communication module 350 provides an interface for the short range communication with other short range communication device. For example, the short range communication module 350 provides at least one interface of NFC, Bluetooth, and Zigbee.

The controller 360 controls the functions of the components of the portable terminal. In particular, the controller 360 controls to search for the place involving the downloaded contents. The function for searching for the content related place is divided largely into a function for storing the device address for the short range communication in the contents, and a function for searching for the content related place using the stored device address.

The operations of the controller 360 for storing the device address are explained first. When the contents are downloaded through the mobile communication module 340, the controller 360 determines whether the contents include the device address for the short range communication. When the device address is contained, the controller 360 extracts the device address, assigns the identification information for the contents, and stores the identification information and the device address to the storage unit 330. For example, the identification information can include at least one of the index and the storage location of the contents. The controller 360 can classify the device address based on the contents.

The operations of the controller 360 for searching for the content related place are described. Upon confirming the command corresponding to the content related place search function through the input unit 310, the controller 360 searches the surrounding area through the short range communication module 350 using the device address stored to the storage unit 330. According to an exemplary embodiment of the present disclosure, the controller 360 transmits the signal requesting particular information to the short range communication device of the stored device address through the short range communication module 350, and checks whether the response is received. Alternatively, the controller 360 transmits the signal requesting the device address of the nearby short range communication device through the short range communication module 350, and compares the obtained at least one device address with the device address stored to the storage unit 330. When discovering the short range communication device of the stored device address, the controller 360 displays the contents corresponding to the stored device address in the display unit 320. At this time, the controller 360 can inform of the content related place in the vicinity and inquire about whether to display the contents. When the user selects not to display the contents, the controller 360 does not display the contents.

By informing of the existence of the place involving the contents stored to the portable terminal, the utilization of the contents such as coupon stored by the user can be raised. Therefore, the advertising effect using the mobile communication network can be enhanced and the user's satisfaction can be increased.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a portable terminal, the method comprising:

receiving contents from at least one of a message, an e-mail, a social network service message, or a web page, the contents comprising a device address for short range communication;

storing the device address and the received contents;

searching for a short range communication device that uses the device address; and in response to discovering the short range communication device that uses the stored device address, displaying the stored contents corresponding to the device address.

2. The method of claim 1, wherein the searching for the short range communication device that uses the device address comprises:

transmitting a signal requesting particular information to the short range communication device that uses the device address; and determining whether a response for the signal is received.

3. The method of claim 1, wherein the searching for the short range communication device that uses the device address comprises:

transmitting a signal requesting a device address of a nearby short range communication device; and comparing at least one device address obtained from a response for the signal with the device address.

4. The method of claim 1, wherein storing the device address comprises:

assigning identification information for the contents; and storing the identification information and the device address.

5. The method of claim 4, wherein the identification information comprises at least one of an index corresponding to the contents and a storage location of the contents.

6. The method of claim 1, wherein storing the device address comprises:

classifying the device address based on the contents.

7. The method of claim 1 further comprising:

before searching for the short range communication device, determining whether a content related place search function is activated.

8. The method of claim 1, wherein the short range communication is one of Near Field Communication (NFC), Bluetooth, and Zigbee.

9. The method of claim 1, wherein searching for the short range communication device comprises searching for the short range communication device in response to receiving a request of a user of the portable terminal to search the portable terminal for a coupon associated with a location of the portable terminal.

10. An apparatus of a portable terminal, the apparatus comprising:

a first communication module configured to receive contents from at least one of a message, an e-mail, a social network service message, or a web page, the contents comprising a device address for short range communication;

a storage unit configured to store the device address and the received contents;

a second communication module configured to provide an interface for the short range communication; and a controller configured to search for a short range communication device that uses the device address using the second communication module, and to control display of the stored contents corresponding to the device address in response to the short range communication device that uses the device address being discovered.

11. The apparatus of claim 10, wherein the controller is further configured to transmit a signal requesting particular information to the short range communication device that uses the device address using the second communication module and determine whether a response for the signal is received.

12. The apparatus of claim 10, wherein the controller is further configured to transmit a signal requesting a device address of a nearby short range communication device using the second communication module and compare at least one device address obtained from a response for the signal with the device address.

13. The apparatus of claim 10, wherein the controller is further configured to assign identification information for the contents and store the identification information and the device address.

14. The apparatus of claim 13, wherein the identification information comprises at least one of an index corresponding to the contents and a storage location of the contents.

15. The apparatus of claim 10, wherein the controller is further configured to classify and store the device address based on the contents.

16. The apparatus of claim 10, wherein the controller is further configured to determine whether a content related place search function is activated before searching for the short range communication device using the second communication module.

17. The apparatus of claim 10, wherein the short range communication is one of Near Field Communication (NFC), Bluetooth, and Zigbee.

18. The apparatus of claim 10, wherein the controller is configured to search for the short range communication device using the second communication module in response to receiving a request of a user of the portable terminal to search the portable terminal for a coupon associated with a location of the portable terminal.

* * * * *